(12) United States Patent
Zika et al.

(10) Patent No.: US 11,608,860 B2
(45) Date of Patent: Mar. 21, 2023

(54) FORCE TRANSMISSION ASSEMBLY HAVING CERAMIC PARTS

(71) Applicant: Aktiebolaget SKF, Gothenburg (SE)

(72) Inventors: Thomas Zika, Gerolzhofen (DE); Gerwin Preisinger, Sierning (AT)

(73) Assignee: Aktiebolaget SKF, Gothenburg (SE)

( * ) Notice: Subject to any disclaimer, the term of this patent is extended or adjusted under 35 U.S.C. 154(b) by 203 days.

(21) Appl. No.: 15/720,596

(22) Filed: Sep. 29, 2017

(65) Prior Publication Data

US 2018/0087579 A1 Mar. 29, 2018

(30) Foreign Application Priority Data

Sep. 29, 2016 (DE) .......................... 102016218830.5

(51) Int. Cl.
| *F16D 1/08* | (2006.01) |
|---|---|
| *F16D 3/04* | (2006.01) |

(Continued)

(52) U.S. Cl.
CPC ............ *F16D 1/0876* (2013.01); *C04B 35/10* (2013.01); *C04B 35/48* (2013.01); *C04B 35/584* (2013.01); *C04B 35/597* (2013.01); *F16C 3/035* (2013.01); *F16D 1/04* (2013.01); *F16D 3/04* (2013.01); *F16D 3/06* (2013.01); *F16D 3/227* (2013.01);

(Continued)

(58) Field of Classification Search
CPC . F16D 1/04; F16D 1/06; F16D 1/0876; F16D 3/04; F16D 3/06; F16D 3/227; F16D 2200/0039; F16D 2200/0047; F16D 3/065; Y10T 403/7021; Y10T 403/7035; F16C 3/035; F16H 57/0025

See application file for complete search history.

(56) References Cited

U.S. PATENT DOCUMENTS

| 2,952,145 A | * | 9/1960 | Thompson | .............. F16D 3/065 |
| | | | | 464/167 |
| 3,020,736 A | * | 2/1962 | Babelay | .................. F16D 3/221 |
| | | | | 464/141 |

(Continued)

FOREIGN PATENT DOCUMENTS

| DE | 1219291 B | * | 6/1966 | ............. F16D 3/065 |
| DE | 1267479 B | * | 5/1968 | ............. F16D 3/065 |

(Continued)

*Primary Examiner* — Matthew R McMahon
(74) *Attorney, Agent, or Firm* — Garcia-Zamor Intellectual Property Law; Ruy Garcia-Zamor; Bryan Peckjian

(57) ABSTRACT

A force-transmitting assembly includes a metal shaft having at least two longitudinally-extending grooves defined in an outer surface, and a metal hub having at least two longitudinally-extending grooves defined in an inner surface that surrounds the outer surface of the shaft. A plurality of discrete parts is disposed in the at least two longitudinally-extending grooves of the shaft and the hub in an interference-fit manner so as to transmit a torque from the shaft to the hub. Each of the discrete parts is composed of at least 50 mass % of technical ceramic selected from $Si_3N_4$, SiAlON, $Al_2O_3$, $ZrO_2$, or a mixture of two or more of $Si_3N_4$, SiAlON, $Al_2O_3$, and $ZrO_2$.

18 Claims, 3 Drawing Sheets

(51) Int. Cl.
  *F16D 3/06*     (2006.01)
  *F16C 3/035*    (2006.01)
  *F16D 3/227*    (2006.01)
  *C04B 35/10*    (2006.01)
  *C04B 35/48*    (2006.01)
  *C04B 35/584*   (2006.01)
  *C04B 35/597*   (2006.01)
  *F16D 1/04*     (2006.01)
  *F16H 57/00*    (2012.01)

(52) U.S. Cl.
  CPC .. *F16H 57/0025* (2013.01); *C04B 2235/3217* (2013.01); *C04B 2235/3244* (2013.01); *C04B 2235/3869* (2013.01); *C04B 2235/3873* (2013.01); *F16D 2200/0039* (2013.01); *F16D 2200/0047* (2013.01); *Y10T 403/7021* (2015.01); *Y10T 403/7035* (2015.01)

(56) References Cited

U.S. PATENT DOCUMENTS

| | | | | |
|---|---|---|---|---|
| 3,112,625 A | * | 12/1963 | Leto | F16D 3/065 464/87 |
| 3,112,627 A | * | 12/1963 | Gissel | G03B 3/00 464/162 |
| 3,203,202 A | * | 8/1965 | Brownyer | F16C 3/035 464/167 |
| 3,392,599 A | * | 7/1968 | White | B62D 1/192 74/492 |
| 3,517,754 A | * | 6/1970 | Hughes | E21B 17/073 173/104 |
| 3,604,285 A | * | 9/1971 | Olsson | B62D 1/192 188/371 |
| 3,729,953 A | * | 5/1973 | Wanzer | F16D 3/227 464/152 |
| 3,797,276 A | * | 3/1974 | Orain | F16D 3/065 464/167 |
| 3,884,051 A | * | 5/1975 | Bottoms | F16C 29/04 175/321 |
| 4,244,455 A | * | 1/1981 | Loker | F16D 11/04 192/24 |
| 4,311,028 A | * | 1/1982 | Brown | F16D 3/58 464/33 |
| 4,433,875 A | * | 2/1984 | Walter | F16C 29/04 384/49 |
| 4,702,326 A | * | 10/1987 | Salmi | B25D 17/084 173/104 |
| 4,904,228 A | * | 2/1990 | Frear | E21B 17/05 464/152 |
| 5,538,558 A | * | 7/1996 | Ookouchi | C23C 2/003 118/419 |
| 5,704,838 A | * | 1/1998 | Teale | F16D 3/223 464/19 |
| 5,709,605 A | * | 1/1998 | Riefe | B62D 1/192 464/162 |
| 5,954,880 A | * | 9/1999 | Aoki | C23C 2/003 118/423 |
| 6,186,015 B1 | * | 2/2001 | Regueiro | F16H 25/2204 74/424.9 |
| 6,241,391 B1 | * | 6/2001 | Hoose | B60G 3/01 188/322.16 |
| 6,510,756 B2 | * | 1/2003 | Aota | B62D 1/192 280/777 |
| 6,761,503 B2 | * | 7/2004 | Breese | F16C 3/035 384/49 |
| 6,905,280 B2 | * | 6/2005 | Brunner | F16D 1/08 403/355 |
| 6,949,025 B1 | * | 9/2005 | Kraus | E21B 4/02 464/143 |
| 7,416,216 B2 | * | 8/2008 | Shoda | B62D 1/185 280/775 |
| 7,429,060 B2 | * | 9/2008 | Yamada | B62D 1/16 280/755 |
| 7,481,130 B2 | * | 1/2009 | Yamada | F16C 3/035 74/493 |
| 7,559,267 B2 | * | 7/2009 | Yamada | B62D 1/185 280/775 |
| 7,651,400 B2 | * | 1/2010 | Yamazaki | F16D 3/223 148/639 |
| 7,753,800 B2 | * | 7/2010 | Tokioka | F16D 3/065 464/167 |
| 7,877,043 B2 | * | 1/2011 | Yamazaki | F16D 3/227 399/167 |
| 8,052,535 B2 | * | 11/2011 | Miyawaki | B62D 1/185 464/83 |
| 8,342,056 B2 | * | 1/2013 | Tokioka | B62D 1/16 74/493 |
| 8,366,558 B2 | * | 2/2013 | Muramatsu | C04B 35/593 464/132 |
| 8,376,624 B2 | * | 2/2013 | Muramatsu | C04B 35/593 384/492 |
| 8,506,202 B2 | * | 8/2013 | Nakagawa | F16D 1/072 403/359.6 |
| 9,194,437 B2 | * | 11/2015 | Yoo | F16D 3/2055 |
| 10,000,119 B2 | * | 6/2018 | Goethe | B60K 17/22 |
| 10,538,264 B2 | * | 1/2020 | Abonyi | F16C 29/04 |
| 2005/0257639 A1 | * | 11/2005 | Yamada | B62D 1/185 74/493 |
| 2006/0040750 A1 | * | 2/2006 | Chen | F16D 1/0876 464/152 |
| 2006/0156855 A1 | * | 7/2006 | Yukawa | B62D 1/16 74/493 |
| 2007/0157754 A1 | | 7/2007 | Yamada | |
| 2013/0072312 A1 | * | 3/2013 | Wormsbaecher | F16D 3/223 464/145 |
| 2013/0164081 A1 | * | 6/2013 | Hermes | E21B 17/043 403/343 |
| 2016/0153500 A1 | * | 6/2016 | Miyake | C09D 7/61 464/162 |

FOREIGN PATENT DOCUMENTS

| | | | |
|---|---|---|---|
| EP | 2163775 A1 | 3/2010 | |
| FR | 1070248 A | * 7/1954 | |
| FR | 1373752 A | * 10/1964 | ............ F16D 3/065 |
| JP | H04354858 A | 12/1992 | |

* cited by examiner

FORCE TRANSMISSION ASSEMBLY HAVING CERAMIC PARTS

CROSS-REFERENCE

This application claims priority to German patent application no. 10 2016 218 830.5 filed on Sep. 29, 2016, the contents of which are fully incorporated herein by reference.

TECHNOLOGICAL FIELD

The disclosure relates to force transmission assemblies that have one or more ceramic parts for transmitting a force, e.g., a torque, from one component to another component.

BACKGROUND

Known shaft-hub connections often include keys for transmitting the rotating force (torque) from the shaft to the hub.

However, in electrical devices, bearing damage may occur due to current discharge, in particular in modern frequency-converter-driven motors/generators. Electrically-insulated, rolling element bearings can solve this problem in the electrical device itself, but this often shifts the current discharge problem to the driven machine, e.g., a transmission, etc.

In order to prevent this current discharge damage to the driven machine, the electrical device must be electrically insulated from all other components. However, depending on the particular application, there may be limited possibilities available to provide such electrical insulation. For example, plastic-based (polymer) devices could be used to provide electrical insulation, but they have the disadvantage of low stiffness and/or low load-transmission capability.

SUMMARY

It is therefore one object of the present teachings to disclose a force transmission assembly of the above-described type that has high efficiency.

In one aspect of the present teachings, an assembly may include a first component, a second component, and a connecting unit configured to transmit a force, e.g., a torque, from the first component to the second component during operation (e.g., rotation) of the assembly.

Preferably, the connecting unit is composed of at least a majority of technical ceramic. A "majority" of the connecting unit shall be understood to be at least 50 mass %, preferably at least 75 mass %, and particularly preferably at least 90 mass-%. The connecting unit may be entirely composed of technical ceramic.

A high efficiency can be achieved by using such a design. For example, a reliable electrical insulation, specifically in the high-frequency range, can be achieved. In particular, in comparison to providing insulation of the two components based on ceramic layers, a sufficient impedance can be achieved, as well as a sufficient stability and strength.

In some aspects of the present teachings, a compact design can be achieved. In addition or in the alternative, a high stiffness (rigidity) and/or a high load-transmission capability can be achieved, especially in comparison to elastomer insulators.

Preferably the technical ceramic contains $Si_3N_4$, SiAlON, $Al_2O_3$, $ZrO_2$, and/or mixtures of these materials. The connecting unit may be composed entirely, or substantially entirely (at least 95 mass %), of $Si_3N_4$, SiAlON, $Al_2O_3$, $ZrO_2$, and/or mixtures of these materials.

The first component and the second component may be each independently selected from the group consisting of a mechanical coupling half, a shaft, a hub, and a gear.

The connecting unit preferably includes two, three, four, five, or more parts that are each configured in a one-piece manner, i.e. discrete parts. In some aspects of the present teachings, one, more or all of these discrete parts may be structurally identical and/or composed entirely of ceramic. These parts may serve or act as keys, i.e. machine elements used to connect two rotating element and prevent relative rotation between the first and second components, also preferably enabling torque transmission from the first component to the second component and/or vice versa. In some aspects of the present teachings, the key(s) may permit relative axial (longitudinal) movement between the first and second components, although the key(s) may also prevent or block relative axial (longitudinal) movement depending upon the application of the present teachings.

One, more or all of these parts (keys) is preferably roller-shaped or spherical or cube-shaped. One, more or all of these parts may be a rolling element that is suitable for use in a rolling-element bearing. A cost-effective design can thereby be achieved.

In some aspects of the present teachings, forces and/or torques can be supported and/or transmitted in an axial direction and/or in a radial direction of the first and second components.

In another aspect of the present teachings, the connecting unit may attach, connect, or couple the second component to the first component in an interference-fit manner with respect to a circumferential direction and/or a longitudinal direction of the first component. Preferably, it is possible to support and/or transmit forces and torques in the axial and radial direction.

In another aspect of the present teachings, the first component may include at least one groove (keyway), in which at least one part of the connecting unit engages (sits). If axial displacement is supported (permitted), length variations (i.e. expansion or contraction) caused by temperature changes can be compensated.

Preferably the first component includes at least one groove and the second component also includes at least one groove in which the at least one part of the connecting unit engages (sits or fits). In addition or in the alternative, the first component, the second component and the connecting unit are designed to permit axial displaceability and/or to support relative movements of the first and second components in the longitudinal direction. "Axial displaceability" shall be understood in particular to mean an axial displaceability of the two components relative to each other.

Both the first component and the second component may include at least one groove into which the at least one part of the connecting unit engages, more preferably at least two grooves, at least three grooves or even at least four grooves.

In preferred designs, the first and the second component are displaceable relative to each other in the longitudinal (axial) direction of the first component.

Preferably the first component is a motor shaft or a transmission shaft.

The present force transmission assembly may be advantageously utilized in an electric vehicle, in particular an electric car, in view of the electrical insulation (electrical isolating effect) provided by the connecting unit containing one or more parts primarily composed of a non-conducting ceramic.

Further objects, embodiments, advantages will be apparent from the following description of an exemplary embodiment of the invention with reference to the drawing, as well as the appended claims. The drawing, the description, and the claims contain numerous features in combination. A person of ordinary skill in the art will understand that the disclosed features may be utilized individually or may be combined into additional advantageous combinations.

BRIEF DESCRIPTION OF THE DRAWING

The sole FIGURE schematically shows a cross-section through a shaft-hub connection perpendicular to a longitudinal (axial) direction of the shaft.

DETAILED DESCRIPTION

Figure 1:
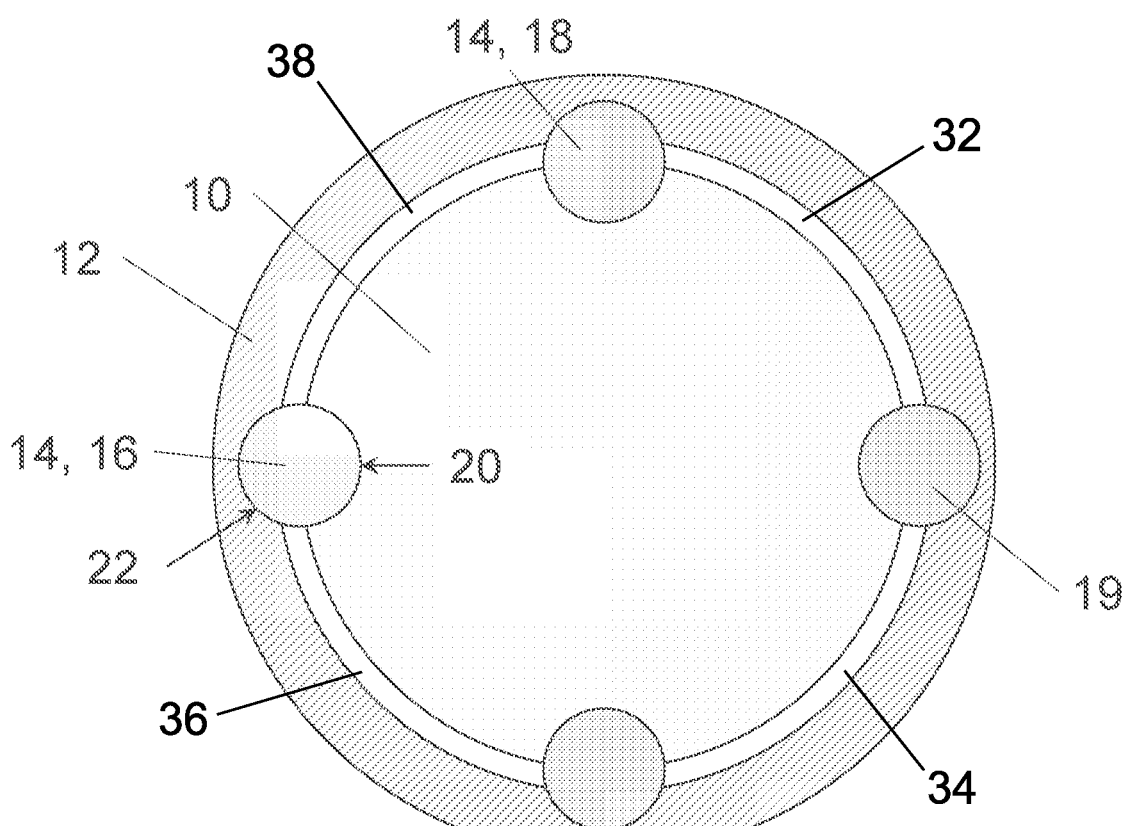
Figure 2:
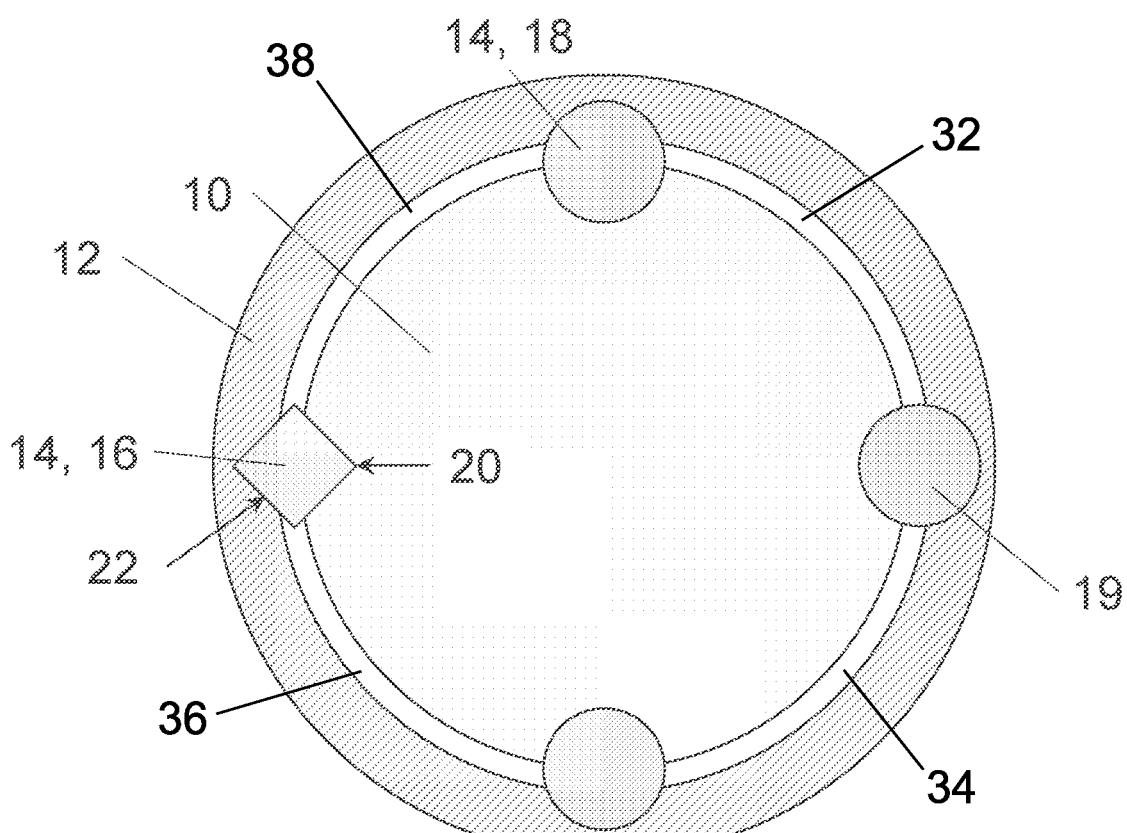
Figure 3:
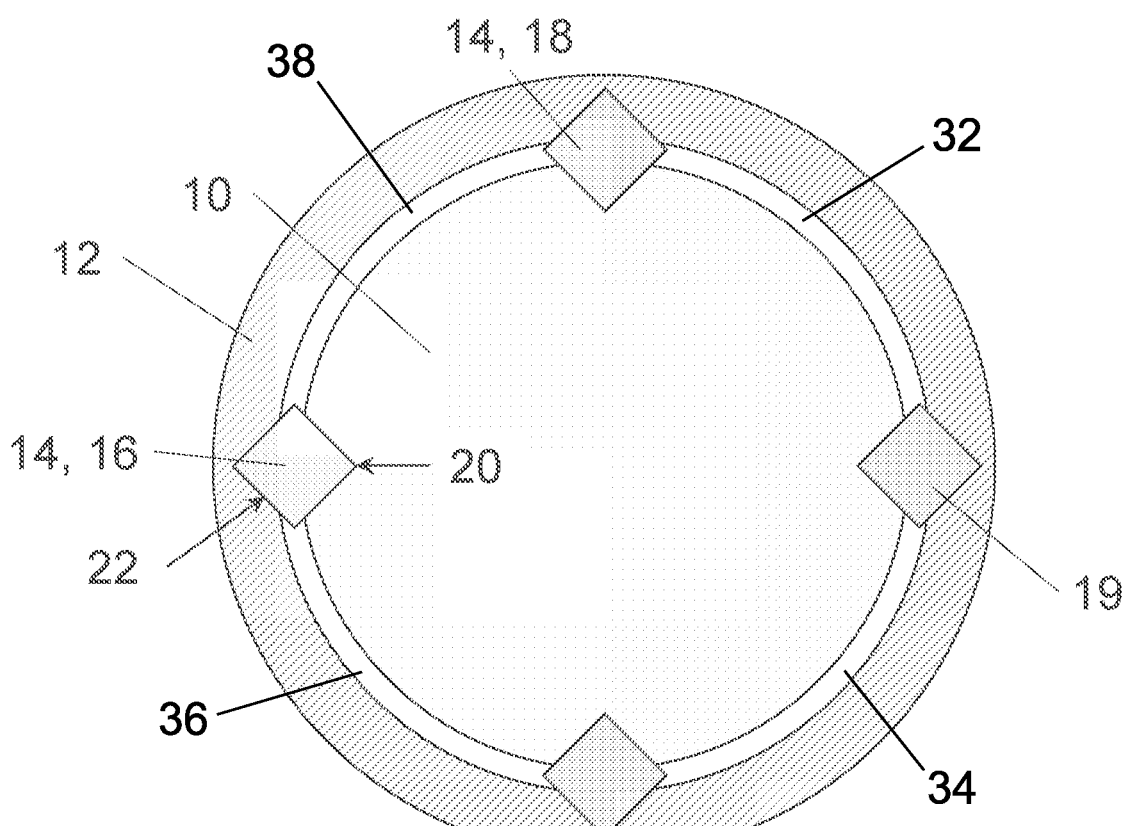

FIG. 1 shows a cross-section through an inventive assembly, which can be part of (utilized in) an electric vehicle. The assembly includes a first component 10 configured as a shaft and a second component 12 configured as a hub. A connecting unit 14 of the assembly connects the first and the second components 10, 12, e.g., with a space or gap (e.g., an annular air gap) between the first and second components 10, 12. Such a space or air gap also serves to electrically isolate the first component 10 from the second component 12. FIG. 2 shows the cross-section through the inventive assembly where the one part 16 of the connecting unit 14 comprises a cube shape. FIG. 3 shows the cross-section through the inventive assembly where all parts of the connecting unit 14 have a cube-shape.

The connecting unit includes a first part 16 and a second part 18. The connecting unit also includes two further parts 19. In the first embodiment as shown in FIG. 1, the four parts 16, 18, 19 are all structurally identical and are balls, which may be designed, e.g., as rolling elements for a ball bearing. In the second embodiment as shown in FIG. 2, one or more parts may be structurally different and, for example, one or more parts 16 being cube-shaped and the other parts 18, 19 being balls. In the third embodiment as shown in FIG. 3, the four parts 16, 18, 19 are all structurally identical and are cube-shaped.

The four parts 16, 18, 19 are composed of technical ceramic, preferably silicon nitride. However, the technical ceramic can also be composed of one or more of SiAlON (also known as "Sialon"), $Al_2O_3$ (aluminum oxide), $ZrO_2$ (zirconium dioxide or zirconia) and/or silicon nitride ($Si_3N_4$), e.g., including mixtures of these materials.

The connecting unit 14 (i.e. parts 16, 18, 19) is provided to transmit torque to the component 12 when the first component 10 is rotated about its longitudinal axis. For this purpose the connecting unit 14 (i.e. parts 16, 18, 19) connects the second component 12 to the first component 10 in an interference-fit manner with respect to the circumferential direction of the first and second components 10, 12.

Preferably, each of the four parts 16, 18, 19 is disposed (sits, engages, fits) in a respective groove 20 of the first component 10 and also in a respective groove 22 of the second component 12. Each of the grooves 20 has a longitudinal direction that extends parallel to the longitudinal (axial) direction of the first component 10, e.g., the rotational axis of the first component 10. Similarly, the respective longitudinal (axial) directions of the grooves 22 all extend parallel to the longitudinal direction (e.g., rotational axis) of the first component 10.

Therefore, when the first component 10 undergoes an accelerated rotational movement, groove boundaries (edges, walls, rims, etc.) of the grooves 20 exert forces on the four parts 16, 18, 19. This causes the parts 16, 18, 19 to exert forces on the boundaries (edges, walls, rims, etc.) of the grooves 22, thereby causing the second component 12 to accelerate (rotate).

The first and second components 10, 12 may be metallic components. For example, the first component 10 may be a motor shaft or a transmission shaft, e.g., of an electric vehicle.

The parts 16, 18, 19 of the connecting unit 14 provide an electrical insulation between the first and second components 10, 12 that has a low electric capacitance and/or high impedance even at high-frequency currents. As noted above, the electrical insulating (isolating) effect may be further increased by making the diameter of the parts 16, 18, 19 greater than the combined depths of the grooves 20, 22, such that an annular (circumferential) air gap is defined between the outer (e.g., circumferential) surface of the first component 10 and the inner (e.g., circumferential) surface of the second component 12. The radial location of the arcuate path of each individual air gap 32, 34, 36, 38 is constant.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved force transmission assemblies.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

10 Component
12 Component
14 Connecting unit
16 Part (ball)
18 Part (ball)
19 Part (ball)
20 Groove
22 Groove

We claim:
1. A force-transmitting assembly comprising:
a first component,
a second component, and a connecting unit configured to transmit a force from the first component to the second component, the first component, the second component and the connecting unit are configured to permit axial displacement parallel to a longitudinal axis to allow relative axial movement between the first component and the second component after the assembly has been assembled, the first component and the second component being incapable of pivoting radially off the longitudinal axis, wherein the connecting unit is composed of a plurality of elements that are formed of at least a majority of technical ceramic, wherein at least one of the plurality of elements is cube-shaped, wherein the first component comprises at least one first component groove, the at least one first component groove defining a first depth and being configured to receive at least one of the plurality of elements, wherein the second component comprises at least one second component groove, the at least one second component groove defining a second depth and being configured to receive at least one of the plurality of elements, wherein an air gap is present between the first and second components due to a diameter of the plurality of elements being greater than the sum of the first depth and the second depth, the air gap comprising a plurality of individual air gaps each located between adjacent elements of the plurality of elements, the plurality of individual air gaps each extending continuously between the adjacent elements such that each define a single constant pathway free of other components, wherein the first component does not contact the second component, and wherein a first component race is formed by a portion of each of the at least one first component groove and a second component race is formed by a portion of each of the at least one second component groove, the first component race and the second component race are in contact with one of the plurality of elements such that a radially innermost portion of the first component race is in contact with a radially innermost portion of the one of the plurality of elements, and wherein each of the individual air gaps extends along a single arcuate path.

2. The force-transmitting assembly according to claim 1, wherein the connecting unit is configured to transmit a torque from the first component to the second component.

3. The force-transmitting assembly according to claim 2, wherein the first component is a mechanical coupling half, a shaft, a hub, or a gear.

4. The force-transmitting assembly according to claim 3, wherein the connecting unit includes at least two discrete parts.

5. The force-transmitting assembly according to claim 4, wherein the at least two discrete parts are structurally identical.

6. The force-transmitting assembly according to claim 5, wherein the at least two discrete parts are entirely composed of ceramic.

7. The force-transmitting assembly according to claim 6, wherein the at least two discrete parts are roller-shaped or spherical.

8. The force-transmitting assembly according to claim 6, wherein the at least two discrete parts are spherical.

9. The force-transmitting assembly according to claim 1, wherein the connecting unit connects the second component to the first component in an interference-fit manner with respect to a circumferential direction of the first component.

10. The force-transmitting assembly according to claim 9, wherein:
the at least one first component groove comprises at least two longitudinally-extending first component grooves,
the at least one second component groove comprises at least two longitudinally-extending second component grooves, and
the connecting unit includes at least two spherical discrete parts that are respectively disposed in the at least two longitudinally-extending first component grooves and the at least two longitudinally-extending second component grooves.

11. The force-transmitting assembly according to claim 10, wherein the first component is a motor shaft or a transmission shaft.

12. The force-transmitting assembly according to claim 11, wherein the technical ceramic is $Si_3N_4$, SiAlON, $Al_2O_3$, $ZrO_2$, or a mixture of two or more of $Si_3N_4$, SiAlON, $Al_2O_3$, and $ZrO_2$.

13. The force-transmitting assembly according to claim 1, wherein the technical ceramic is $Si_3N_4$, SiAlON, $Al_2O_3$, $ZrO_2$, or a mixture of two or more of $Si_3N_4$, SiAlON, $Al_2O_3$, and $ZrO_2$.

14. A force-transmitting assembly comprising:
a metal shaft having at least two longitudinally-extending shaft grooves defined in an outer surface and each having a shaft groove depth,
a metal hub having at least two longitudinally-extending hub grooves defined in an inner surface that surrounds the outer surface of the shaft and each having a hub groove depth, and
a plurality of discrete parts disposed in the at least two longitudinally-extending shaft grooves and the at least two longitudinally-extending hub grooves in an interference-fit manner so as to transmit a torque from the metal shaft to the metal hub, the metal hub, the metal shaft, and the plurality of discrete parts are configured to permit axial displacement parallel to a longitudinal axis to allow relative axial movement between the metal hub and the metal shaft after the assembly has been assembled,
wherein at least one of the plurality of discrete parts is cube-shaped,
wherein each of the discrete parts is composed of at least fifty percent by mass (50 mass %) of technical ceramic,
wherein an air gap is present between the metal shaft and the metal hub due to a diameter of the plurality of discrete parts being greater than the sum of the shaft groove depth and the hub groove depth, the air gap comprising a plurality of individual air gaps each extending between adjacent discrete parts of the plurality of discrete parts, the plurality of individual air gaps each extending continuously between the adjacent discrete parts such that each define a single constant pathway free of other components,
wherein the metal shaft does not contact the metal hub, and
wherein a shaft race is formed by a portion of each of the at least two longitudinally-extending shaft grooves that are in contact with one of the plurality of discrete parts, such that a radially innermost portion of the shaft race is in contact with a radially innermost portion of the one of the plurality of discrete parts, and wherein each of the individual air gaps extending along a single arcuate path.

15. The force-transmitting assembly according to claim 14, wherein the technical ceramic is $Si_3N_4$, SiAlON, $Al_2O_3$, $ZrO_2$, or a mixture of two or more of $Si_3N_4$, SiAlON, $Al_2O_3$, and $ZrO_2$.

16. The force-transmitting assembly according to claim 15, wherein at least one of the plurality of discrete parts is roller-shaped or spherical.

17. The force-transmitting assembly according to claim 16, wherein at least one of the plurality of discrete parts is spherical, and wherein the discrete parts all contain at least 95 mass % of $Si_3N_4$, SiAlON, $Al_2O_3$, $ZrO_2$, or a mixture of two or more of $Si_3N_4$, SiAlON, $Al_2O_3$, and $ZrO_2$.

18. A force-transmitting assembly comprising:
a first component,
a second component, and
a connecting unit configured to transmit a force from the first component to the second component, the first component, the second component and the connecting unit are configured to permit axial displacement parallel to a longitudinal axis to allow relative axial movement between the first component and the second component after the assembly has been assembled,
wherein the connecting unit is composed of a plurality of elements that are formed of at least a majority of technical ceramic,
wherein at least one of the plurality of elements is cube-shaped,
wherein the first component comprises at least one first component groove, the at least one first component groove defining a first depth and being configured to receive at least one of the plurality of elements,
wherein the second component comprises at least one second component groove, the at least one second component groove defining a second depth and being configured to receive at least one of the plurality of elements,
wherein an air gap is present between the first and second components due to a diameter of the plurality of elements being greater than the sum of the first depth and the second depth, the air gap comprising a plurality of individual air gaps each extending between adjacent elements of the plurality of elements, the plurality of individual air gaps each extending continuously between the adjacent elements such that each define a single constant arcuate pathway free of other components,
wherein the first component does not contact the second component, and
wherein a first component race is formed by a portion of each of the at least one first component groove and a second component race is formed by a portion of each of the at least one second component groove, both the first component race and the second component race are in contact with one of the plurality of elements such that a radially innermost portion of the first component race is in contact with a radially innermost portion of the one of the plurality of elements, wherein the plurality of elements comprises at least four elements evenly positioned about the first component so as to prevent axial misalignment between the first component and the second component.

* * * * *